Patented Dec. 1, 1942

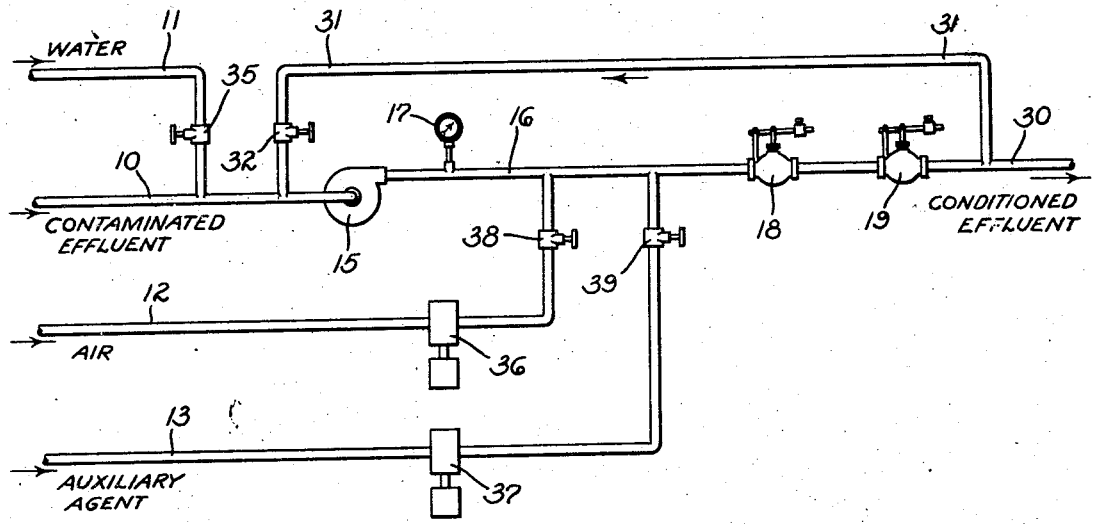
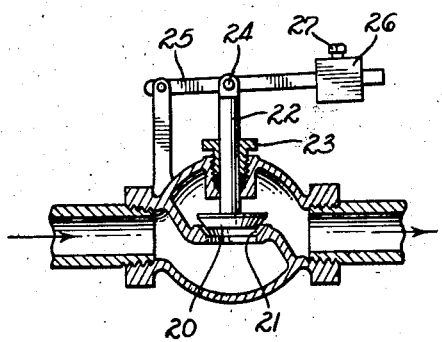

2,303,588

UNITED STATES PATENT OFFICE 2,303,588

METHOD OF TREATING WASTE WATER

Richard W. Stenzel, Long Beach, Calif., assignor to Petrolite Corporation, Ltd., Wilmington, Del., a corporation of Delaware Application October 31, 1939, Serial No. 302,127

6 Claims. (Cl. 210—2)

This invention relates to the treatment of waste liquors and, more particularly, to the conditioning of oily effluents to prevent accumulation of objectionable oil films on the surface of rivers, harbors, or other recipient water into which the effluent may be discharged.

While my invention is not limited in its advantageous application to waste containing oil or similar material of lower density than the water into which it is desired to discharge the waste, the treatment of wastes in this category constitutes one of the chief objects of my invention. Waste water containing small quantities of oil is produced in many industries, and its disposal constitutes a serious problem, inasmuch as the direct discharge of such material into a river or harbor results in the contamination of the surface of the recipient water with a film of oil.

Such effluent waters may be variously produced. In industry, it is often necessary to dispose of large quantities of water which have been used for cooling or condensing purposes. These waters are frequently contaminated with oily matter which is not easily separable or which has such a low economic value that separation processes are not justified. Water of similar characteristics is a frequent waste product from petroleum refineries arising from sumps, skimming ponds, and the like. Similar disposal problems also arise in harbors and lakes where ships find it necessary to unload ballast water which is contaminated with oil. Waste liquors from fish canneries, vegetable oil plants, and a wide variety of other sources frequently contain sufficient oil to make their disposal a serious problem.

The chief problem in the disposal of waste water containing oily material arises from the fact that the oily material, after discharge into the harbor or river, tends to rise to the surface, forming an oily film or surface layer which constitutes a particularly objectionable contamination since a relatively small quantity of the oily matter can spread over a large surface of the recipient water. The recipient water is thus not only rendered unsightly, but objects floating in the water or bounding it are also contaminated. Thus, for example, it has occurred that beaches have been rendered unfit for bathing purposes by oily matter which has spread upon the water and whose source was the effluent from the ballast tanks of ships.

It is an object of this invention to condition effluent water containing oily matter so that the latter will not form continuous films upon the surface of the body of water or otherwise form any localized concentration sufficient to cause objectionable pollution.

I achieve these and other objects by so conditioning the oily waste that the oil particles are prevented from rising to the surface of the recipient water or, at least, so delayed in their rising that by the time they come to the surface of the river or sea they have been so widely dispersed that no appreciable coalescence or film formation can occur. The conditioning step or steps which I employ may vary according to the nature of the oily matter, its concentration in the effluent water, the degree of mitigation of the pollution required, and other factors.

It has been found that, in some instances, the desired ends are attained merely by emulsifying the oily matter in the water effluent to such an extent that the oil is dispersed as very small particles of the order of ten microns or less. In this case, the finely dispersed particles tend to rise very slowly so that by the time they come to the surface of the river or sea they have been so widely dispersed by the natural currents and diffusion processes in the recipient water that no appreciable coagulation or film formation can occur. The required subdivision of the original particles may be accomplished by any of the known methods used for producing or homogenizing emulsions, for example, passage of the effluent through a weight-loaded valve. In general, the smaller the particle size the more effectively will the objects of this invention be attained.

In some instances, an emulsifying agent may be added to aid in the dispersion, particularly where the oily matter per se is resistant toward dispersion. Such agents, a typical example of which is ordinary soap solution, may be any of the substances that promote an oil-in-water emulsion and which are effective in producing the desired results at concentrations low in comparison with the concentration of the oily matter. In addition to aiding the dispersion of the oil into fine droplets, such agents also stabilize the emulsion by the formation of a protective film around each droplet, thus preventing premature coalescence of the droplets during the period in which the concentration of such oily matter is sufficiently high that coalescence might otherwise occur, namely, immediately after the formation of the dispersion, during its discharge into the recipient water, and for a certain period thereafter depending upon the rate at which the effluent diffuses into the recipient water and becomes diluted thereby to the extent that the probability of coalescence is no longer important.

In other instances, it has been found that the oily waste waters may be effectively conditioned by causing the emulsifying process to take place in the presence of air. I have found empirically that the presence of air tends to expedite the dispersion process, and, in addition, the fine particles thus produced are rendered resistant toward subsequent coalescence, which latter protective effect I ascribe to the oxidizing action of the air. I have also found that other substances having similar effects, such as oxygen, chlorine, and solid oxidizing agents such as the permanganates, may be used with similar effectiveness, although in general the nature of the oily matter will determine the kind of oxidizing agent or gas best to use.

The step of dispersing in the presence of air or other oxidizing agents is particularly advantageous in its application to waste waters containing foul or objectionable organic matter, such as found, for example, in fish cannery effluents. The procedure of causing extreme subdivision of the particles, especially in the presence of the air or other oxidizing agents, causes oxidation to take place very readily, resulting in the disappearance of such objectionable properties as foul odors and pathogenic activity.

In still other instances, I have found it desirable to increase the effective density of the oily matter so that the particles of oil are retarded in their rising or, indeed, caused to sink. One very useful method for increasing the effective density of the oily material is to cause it to become associated with relatively dense, finely divided solid material which has the property of being wetted by the oil. If desired, sufficient of the weighting material may be added so that the oil particles will eventually settle to the bottom of the body of water into which the treated effluent is being discharged, thus effectively preventing any objectionable pollution. Any finely divided solid material having a density greater than unity and having a surface preferentially wet by oil is suitable for this purpose. I find iron sulfide to be very effective in this capacity and, in general, all insoluble metallic sulfides are very effective. In some cases, the finely divided solid particles may be produced in situ in the effluent water by the addition of a suitable chemical reagent such as a soluble sulfide which may be added to an effluent water containing iron or other metals in solution. The metal ion content of some waters is naturally sufficiently high for this purpose, and, in other instances, I may augment the concentration of the metal concerned by prior addition of a soluble salt thereof. As another example, an effluent water containing or fortified with sulfate ions may be treated with a barium salt to cause precipitation of barium sulfate. As a rule, the chemical content of the effluent water will determine the kind of precipitants which should be added to give an economically feasible process, although in some instances the water may be economically treated by two reactants to give the desired precipitate. In most instances, the solid matter is preferably added or formed prior to the last emulsification step so that the finely dispersed oily water may come into intimate contact with the solid particles.

Further objects and aspects of my invention will become apparent in the following discussion of the drawing, in which:

Figure 1 represents a flow diagram suitable for the practice of my invention; and Figure 2 is a cross-sectional view of a weight-loaded emulsifying valve shown schematically in Figure 1.

Referring more particularly to Figure 1, 10 is a transfer pipe for the contaminated effluent, 11 is a transfer pipe for water, 12 is a transfer pipe for air, and 13 is a transfer pipe for any desired auxiliary agent, such as a precipitant, emulsifying agent, and the like. The pipe 10 leads to the suction of a pump 15 having a discharge line 16 provided with a pressure gauge 17. The discharge in the pipe 16 is conducted consecutively through two weight-loaded valves 18 and 19. A very suitable structure for such valves is shown in Figure 2, and comprises a bevel face valve 20 arranged in apposition to a valve seat 21, and a valve stem 22 slidably mounted in a bushing 23 and carrying in its upper end a pin 24 serving as a fulcrum for the lever 25 on which is slidably mounted a weight 26 provided with a set-screw 27. In continuous operation, the dynamic and static pressure of the liquid passing between the valve and the valve seat is counterbalanced by the downward thrust of the weighted lever 25, and by suitable adjustment of the position of the weight 26, any desired pressure drop providing the agitation necessary for the desired degree of dispersion may be readily obtained.

Referring again to Figure 1, the second weight-loaded valve 19 is provided with a discharge line 30 which has a branch 31 leading back through a valve 32 to the intake of the pump 15.

Water in the transfer pipe 11 may be commingled with the contaminated effluent in any desired proportion by opening a valve 35. Air and auxiliary agents in the transfer pipes 12 and 13, respectively, may be introduced into the system in desired proportion by proper adjustment of the pumps 36 and 37 and valves 38 and 39.

The operations involved are as follows:

The contaminated effluent normally comprising a small amount of oil associated with a large volume of water is forced by the action of the pump 15 through the weight-loaded valve 18. When the valve is suitably weighted, a substantial pressure drop is obtained thereacross representing a loss in energy which appears largely in extreme turbulence of the mixture being passed through the valve. This turbulent agitation shears the droplets of oil into very small particles, or, in other words, homogenizes the dispersion. The repetition of this step in the weight-loaded valve 19 leads to further subdivision and homogenization. If desired, still further subdivision may be had by recycling a portion of the discharge through the line 31 and valve 32. Frequently, the pump 15 will also exercise a dispersing or homogenizing action, particularly if it is of the centrifugal type.

It will thus be seen that, by appropriate control of pump pressures, valve weightings, and recycle ratios, the oily material associated with the effluent water can be dispersed to any desired degree of fineness. In general, I find that oil droplets dispersed to a size of 10 microns or less will rise sufficiently slowly when commingled with the recipient water, such as the water flowing in the river or harbor, that no appreciable oil film will be observable at any place on the surface of the recipient water.

When it is desired to prevent all traces of surface pollution or when working with an oily material of relatively low density, or when the recipient waters are fairly sluggish in their motion so that the rate of diffusion therein is slow, it is sometimes advantageous to disperse the oily material to droplets even finer than 10 microns. In practical operation, however, the proper degree of dispersion can be readily determined by observation of the surface of the recipient water, the degree of dispersion being increased until surface pollution is no longer manifest.

I have, furthermore, found that by the introduction of air ahead of the dispersing devices, the mechanical process of dispersion is frequently aided, and, in addition, the chemical character of the oil droplets, or at least the character of the droplets surfaces, is desirably altered, resulting in increased stability of the emulsion and greater resistance toward coalescence. The quantity of air thus employed need not be large and is best adjusted for optimum effects by observation of the resulting effluent.

In the treatment of wastes containing organic material which is noxious from the standpoint of odor or pathogenic action, the proportion of air, chlorine, or other oxidizing agent introduced may be proportioned to give the desired modification of these noxious features. It will be noted that the advantage of this combined oxidizing and dispersing treatment is not necessarily limited to its effect on materials which would normally rise to the surface when discharged into the recipient water. Thus, for example, I find that this phase of my process is very advantaneously employed on fish cannery effluents containing proteinaceous sludges susceptible to decomposition whether or not such waste waters contain oil. In such instances, the beneficial effects of my process are manifest both in the disappearance of the immediate noxious characteristics of the effluent water and also in the destruction or stabilization of the fermenting material so that the noxious characteristics do not reappear, thus avoiding potential contamination of the recipient water.

The addition of auxiliary agents through the pipe 13 by means of the pump 37 may be resorted to for the purposes indicated above; for example, an emulsifying agent may be added to aid in the dispersing of the oily material and/or to stabilize the fine droplets ultimately formed. Also, a precipitating material may be added to cause the formation of finely divided, heavy oil-wettable solids in the water being treated, so that such solids become associated with the oil droplets to increase the combined specific gravity to a value preferably higher than that of the recipient water. Also, liquid oxidizing agents and various other chemicals may be added according to the character of the material being treated and the effect desired. In some instances, I may use two or more lines for the addition of auxiliary agents where two or more such agents are used. For example, when it is desired to incorporate iron sulfide into the oil particles, I may add a solution of ferric chloride through one such pipe and a solution of sodium sulfide through a second of such pipes.

In some instances, I find that the dispersion of the oily material in the waste water may be more readily effected by increasing the ratio of water to oil. Such water may be conveniently added through the pipe 11 and valve 35 on the intake side of the pump 15. Such an arrangement also makes possible the treatment of waste material containing little or no water, such as sludges, settlings from tank bottoms, finely ground refuse or garbage, and the like. In such instances, sufficient water is added through the pipe 11 to provide a vehicle for the dispersion of the waste material into the desired fine droplets or particles, thus producing a stable water-continuous emulsion or dispersion which may be discharged into the recipient water without any danger of undesirable contamination.

My process may be adapted to the treatment of wastes containing solid materials which tend to contaminate the surface of the recipient water, such as refuse, garbage, and the like, which may inherently have a specific gravity lighter than water or which may be associated with sufficient grease or oil to produce objectionable contamination. The reduction of the solid material to the desired fine particle size may be variously accomplished, as by use of grinders, ball mills, colloidal mills, and the like, and this reduction is preferably carried out at least in part in the presence of sufficient water to produce a water-continuous dispersion, and with or without the use of emulsifying agents, oxidizing agents, or other auxiliaries herein disclosed.

In all instances, the conditioned effluent comprises a water-continuous emulsion or dispersion in which the dispersed phase consists of particles of oily matter which are of such small dimension that their rate of rise in the recipient water is naturally very slow, so that the particles are greatly diffused therein before they rise to the surface. It is obvious that the rate of diffusion or scattering of the small particles throughout the recipient water is affected by various factors, notably by the currents present in the recipient water, the turbulence of flow of such water, and the like. The proper degree of dispersion necessary to prevent contamination of the recipient waters is thus dependent in part on the natural current present in such waters and should be adjusted to meet the necessary conditions. I find, however, that, when the particles are reduced to the size of 10 microns or less, the conditioned effluent is usually suitable for discharge into any recipient water, including waters in an ocean harbor where the only motion is that of the gradual ebb and flow of the tides.

In most instances, I find that the conditioned effluent is best introduced in the recipient water at some distance below the surface, although this is not essential in many instances, particularly where there is sufficient agitation immediately adjacent the point of discharge to insure rapid dilution of the conditioned effluent.

It is understood that the details of the above illustrations are not limiting and that various modifications and uses of my process may be practiced without departing from the scope of the appended claims.

I claim as my invention:

1. A method for the disposal of effluent waters which are contaminated by waste material by introduction into a large natural body of water while preventing surface-layer contaminations of the surface of said body of water, there being sufficient currents in said body of water to aid in the diffusion of said waste material when introduced thereinto in subdivided form, which method includes the steps of: intimately mixing said effluent water and its contaminant waste material to subdivide said waste material and disperse same throughout the water in the form of very fine relatively stable particles of a size of the order of ten microns or less to form a water-continuous dispersion; and disposing of said waste material by discharging said water-continuous dispersion into said large natural body of water, the size of said particles being such that they become sufficiently diffused and scattered under the influence of said currents to prevent agglomeration thereof, thereby preventing aggregation of the waste material into localized bodies or films.

2. A method for preventing surface-layer contaminations at the surface of a large body of recipient water into which it is desired to discharge, for ultimate disposition, a waste material having a density less than that of the recipient water, the currents in said large body of recipient water being such as to aid in the diffusion of said waste material when introduced thereinto in subdivided form, which method includes the steps of: subdividing said waste material in the presence of large amounts of water to form a homogenized water-continuous dispersion in which said waste material is dispersed in the form of very small particles; and disposing of said waste material by discharging said dispersion into said body of recipient water, the size of said particles being such that they rise only very slowly in the recipient water and such that the diffusion of said particles in said body of recipient water aided by said currents therein causes said particles to be so widely spaced upon reaching the surface of said body of recipient water as to prevent surface-layer contaminations of said surface.

3. A method for the disposal of waste material comprising oil by introduction into a large natural body of water while preventing surface-layer contaminations of the surface of said body of water, there being sufficient currents in said body of water to aid in the diffusion of said waste material when introduced thereinto in subdivided form, said oil having a density less than that of said water, which method includes the steps of: intimately mixing said waste material with large amounts of water and in the presence of a finely divided solid wettable by said oil in preference to water and having a density substantially greater than the water of said body to subdivide said waste material and disperse same throughout the water mixed therewith in the form of very fine relatively stable particles of a size of the order of ten microns or less with which are associated small particles of said solid to form a water-continuous dispersion; and disposing of said waste material by discharging said water-continuous dispersion into said large natural body of water, the size of said particles of waste material and solid being such that they become sufficiently diffused and scattered under the influence of said currents to prevent agglomeration thereof, thereby preventing aggregation of the waste material into localized bodies or films.

4. A method as defined in claim 3, in which said water with which said waste material is mixed contains ions, and in which said finely divided solid wetted by oil in preference to water is produced in situ by adding to the water with which said waste material is mixed a chemical reagent reacting with said ions to produce said finely divided solid.

5. A method for the disposal of waste material by introduction into a large natural body of water while preventing surface-layer contaminations of the surface of said body of water, there being sufficient currents in said body of water to aid in the diffusion of said waste material when introduced thereinto in subdivided form, which method includes the steps of: intimately mixing said waste material in the presence of large amounts of water and an emulsifying agent of the type promoting and stabilizing water-continuous emulsion to subdivide said waste material and disperse same throughout the water mixed therewith in the form of very fine relatively stable particles of a size of the order of ten microns or less to form a water-continuous dispersion; and disposing of said waste material by discharging said water-continuous dispersion into said large natural body of water, the size of said particles and the amount of said emulsifying agent being such that the particles become sufficiently diffused and scattered under the influence of said currents to prevent agglomeration thereof, thereby preventing aggregation of the waste material into localized bodies or films.

6. A method for the disposal of waste comprising organic material by introduction into a large body of water in which there are sufficient currents to aid in the diffusion of said waste when introduced thereinto in subdivided form, which method includes the steps of: subdiving said organic material in the presence of large amounts of water and in the presence of an added oxidizing agent by subjection to an intimate mixing action of such character as to produce extreme subdivision of said organic material into small particles dispersed in the water and to associate said oxidizing agent with said small particles for oxidization thereof, said mixing being controlled to produce a water-continuous dispersion in which said organic material is dispersed as particles of a size of 10 microns or less; and disposing of said waste by introducing said dispersion into said large body of water in such manner that said currents thereof aid in the diffusion of said particles of organic material which have been at least partially oxidized by said oxidizing agent, said diffusion being sufficient to prevent aggregation of said organic material into localized bodies or films.

RICHARD W. STENZEL.